Apr. 24, 1923.
L. B. FLAGLER
SAW CLAMP
Filed June 23, 1919
1,452,551
2 Sheets-Sheet 1
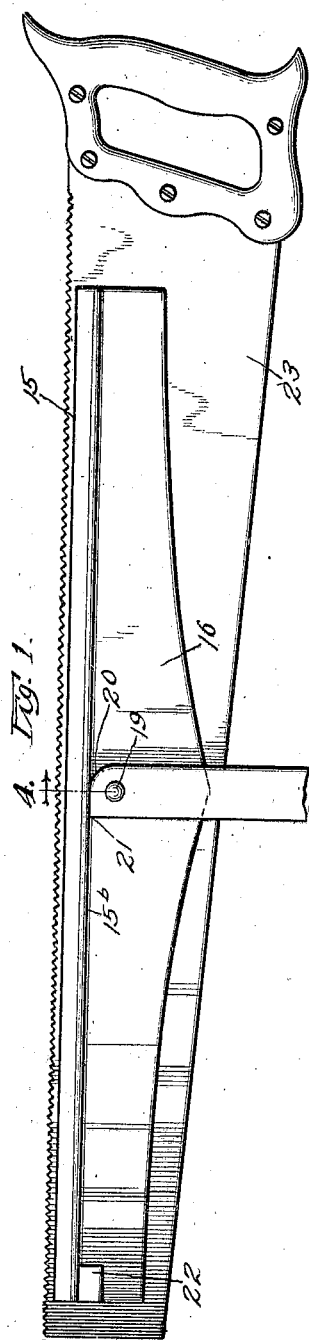
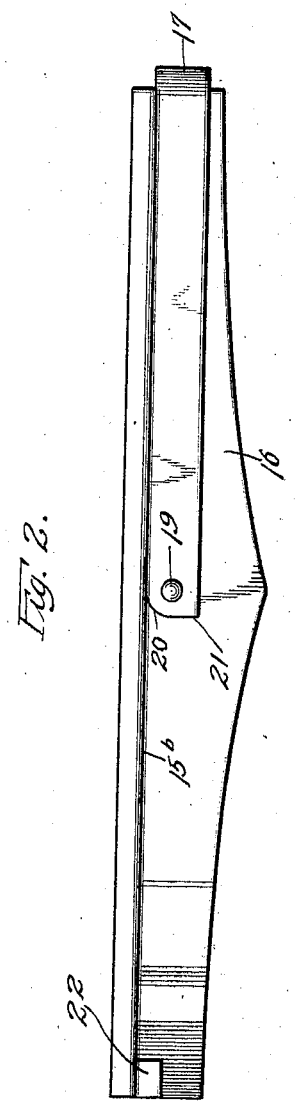

Apr. 24, 1923.

L. B. FLAGLER

SAW CLAMP

Filed June 23, 1919

Witness:
Harry S. Gaither

Inventor
Louis B. Flagler
by Sheridan, Jones, Sheridan and Smith
Attys.

Patented Apr. 24, 1923.

1,452,551

UNITED STATES PATENT OFFICE.

LOUIS BUTTERFIELD FLAGLER, OF BUTTE, MONTANA.

SAW CLAMP.

Application filed June 23, 1919. Serial No. 306,043.

*To all whom it may concern:*

Be it known that I, LOUIS B. FLAGLER, a citizen of the United States, residing at Butte, in the county of Silverbow and State of Montana, have invented certain new and useful Improvements in Saw Clamps, of which the following is a specification.

This invention relates to a saw clamp, and its purpose is to provide a simple, compact and efficient clamping device for holding substantially any kind of a saw, such as carpenters' hand-saws, meat saws, hack saws and the like. The principal object of the invention is to provide an improved clamping device for holding the saw firmly during the operations of filing, setting, or repairing the saw. An important object of the invention is to provide a saw clamp which is adapted to grip the saw blade by spring tension. A further object is to provide a clamp which may be readily attached to any convenient support. Still another object is to provide an improved folding saw clamp which may be readily carried about and which comprises a small number of parts. Other objects relate to various features of construction and arrangement which will be described hereinafter.

The nature of the invention will be understood from the following specification, taken with the accompanying drawings, in which one embodiment is illustrated.

In the drawings—

Figure 1 shows a front view of the saw clamp holding a saw;

Fig. 2 shows a front view similar to Fig. 1 with the saw clamp folded;

Figure 3:
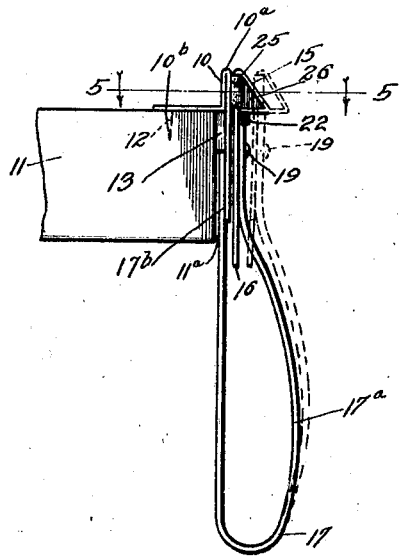
Fig. 3 shows an end view of the saw clamp, looking toward the right as viewed in Fig. 1.
Figure 4:
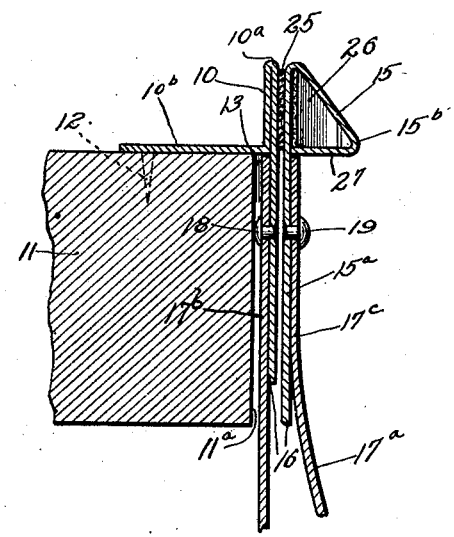
Fig. 4 is a sectional view taken on the line 4—4 of Fig. 1.
Figure 5:
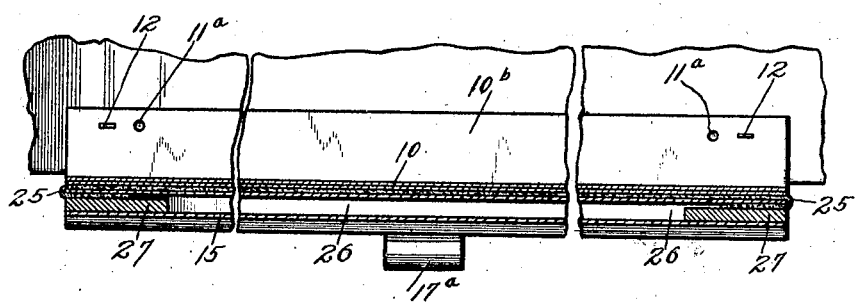
Fig. 5 is a sectional view on the line 5—5 of Fig. 3, looking in the direction of the arrows.

The saw clamp comprises a back jaw 10 which consists of a vertically-extending plate $10^a$ and a transverse plate $10^b$ extending rearwardly therefrom below the upper edge thereof. The plate $10^b$ is adapted to rest upon a supporting member 11 and is provided adjacent each end, and at other points, if desired, with downwardly extending spurs or spikes 12, which are adapted to be driven into the member 11 to hold the jaw of the clamp securely in position. A number of holes $11^a$ are also provided in the plate $10^b$ to receive nails or other means adapted to supplement the spikes if the latter become damaged. Spacing blocks 13 are secured to each end of the vertical plate $10^a$ to space the same outwardly from the front face $11^a$ of the supporting member 11. The rear jaw 10 is adapted to cooperate with the front jaw 15, which comprises a vertical plate $15^a$, adapted to lie parallel to the plate $10^a$, and a longitudinal rib $15^b$ which extends along the top edge of the plate $15^a$ on the front side of the clamp. The plates $10^a$ and $15^a$ of the two jaws are increased in vertical depth adjacent the center of the clamp to form downwardly extending portions 16, and at this point the jaws are united by a spring 17 which comprises a lower lip portion $17^a$ and upper end portions $17^b$ and $17^c$ which lie on opposite sides of the jaws of the clamp, and terminate in proximity to the under-sides of the flange $10^b$ and rib $15^b$, respectively. The upper arm $17^b$ of the spring is pivoted to the plate $10^a$ by a rivet 18, and the arm $17^c$ is pivoted to the plate $15^a$ of the front jaw by a rivet 19, the inner heads of these rivets being counter-sunk into the face of the jaws, so that the jaws have flat surfaces adapted to coact with a saw placed between them. The spacing blocks 13 are of slightly greater thickness than the metal of the spring, so that the arm $17^b$ is permitted to turn freely between the plate $10^d$ and the base $11^a$ of the supporting member. The arms $17^b$ and $17^c$ of the spring are each rounded off on one corner, as shown at 20, while the other corner of each arm is right-angular, as shown at 21. The right-angular corners 21 engage the undersides of the flanges $10^b$ and the rib $15^b$, thus preventing angular movement of the spring in one direction, but the curved portions 20 permit the spring to be folded upwardly into the position shown in Fig. 2. In order to prevent the outer jaw 15 from swinging on its pivot, it is provided at the end opposite the curved portion 20 of the spring with a weight 22 which holds that end of the outer jaw downwardly with the underside of the rib in contact with the square portion 21 of the spring. The rear jaw is, of course, held in fixed position by reason of its connection with the supporting member 11. The parts of the clamp are thus held in the proper relation to each other by means of the connecting spring alone which is pivotally attached to them, and the resilient spring permits these jaws to be separated to receive the blade of a saw 23 between them. In order to prevent vibration and chattering of the saw when it is being filed or otherwise worked upon, a strip of felt, or the like, 25 is placed along the inner side of the outer jaw in contact with the face of the plate 15$^a$, and the ends of this strip of felt are inserted into apertures 26 which are formed in the opposite ends of the rib 15$^b$. Plugs 27 are driven into these apertures to hold the felt securely in contact with the face of the jaw.

It will be apparent that the clamp comprises a minimum number of parts which are united in a practical and simple manner, so that the saw blade 23 is securely held under spring tension. The construction of the clamp permits the saw to be readily inserted or withdrawn from its position between the jaws, and the construction of the clamp and the method of mounting the same permit it to be conveniently carried about and readily mounted in any desired position.

Although I have shown and described a single embodiment of the invention for purposes of illustration, it will be understood that it may be constructed in various other forms without departing from the scope of the appended claims.

What I claim is:

1. In combination, a jaw having means for engaging a support, a movable jaw mounted parallel to said first-named jaw, spring actuated means for connecting and normally holding said jaws in saw engaging relation, a strip of deadening material located along the inner surface of one of said jaws, and removable means for securing said deadening material to the ends of the jaw by which it is carried.

2. In combination, a jaw having means for engaging a support, a movable jaw mounted parallel to said first-named jaw, spring actuated means for connecting and actuating said jaws, a strip of deadening material located along the inner surface of one of said jaws, one of said jaws having apertures in the ends thereof adapted to receive the ends of said strip, and plugs engaging said apertures to secure said strip in position.

3. In combination, a fixed jaw, a movable jaw, a looped spring having the end portions thereof pivotally connected to said jaws, each end portion of said spring having a flat end surface with a rounded corner to permit folding of said spring in one direction, means carried by said jaws to engage the flat end surface of said spring, and a counter-weight carried by said movable jaw on the end thereof opposite the rounded corners of said spring.

4. In combination, a jaw comprising a horizontal flange adapted to rest on a support and a vertical plate adapted to lie alongside the vertical face of said support, means for spacing said plate outwardly from said support, a movable jaw extending alongside said first-named jaw, and a resilient connecting member having its end portions extending on opposite sides of and pivotally connected to said jaws, one end portion of said spring lying between said vertical plate and the vertical face of said support.

5. In combination, a jaw comprising a horizontal flange adapted to rest on a support and a vertical plate adapted to lie alongside the vertical face of said support, means for spacing said plate outwardly from said support, a movable jaw extending alongside said first-named jaw, and a resilient connecting member having its end portions extending on opposite sides of and pivotally connected to said jaws, one end portion of said spring lying between said vertical plate and the vertical face of said support, said movable jaw having a longitudinal rib on its outer side along its upper edge, the end portions of said connecting member having flat end surfaces adapted to engage said horizontal flange and said rib, one corner of each end of said connecting member being rounded to permit folding thereof.

In testimony whereof, I have subscribed my name,

LOUIS BUTTERFIELD FLAGLER.